United States Patent [19]

Wornell

[11] Patent Number: 5,625,642
[45] Date of Patent: Apr. 29, 1997

[54] SPREAD-RESPONSE PRECODING SYSTEM HAVING SIGNATURE SEQUENCES LONGER THAN THE INTER-SYMBOL TIME INTERVAL

[75] Inventor: Gregory W. Wornell, Wellesley, Mass.

[73] Assignee: Lucent Technologies Inc., Murray Hill, N.J.

[21] Appl. No.: 321,292

[22] Filed: Oct. 11, 1994

[51] Int. Cl.$^6$ .................................................. H04B 15/00
[52] U.S. Cl. .......................... 375/206; 375/296; 380/43
[58] Field of Search ................................ 375/206, 296, 375/200, 201, 295, 216, 298, 308, 265, 261, 279, 281, 284; 332/106, 112, 107; 380/9, 37, 43, 47, 42, 44

[56] References Cited

U.S. PATENT DOCUMENTS

| | | | |
|---|---|---|---|
| 5,170,410 | 12/1992 | Gressier et al. | 375/206 |
| 5,245,612 | 9/1993 | Kachi et al. | 320/104.1 |
| 5,416,801 | 5/1995 | Chouly et al. | 375/260 |
| 5,442,662 | 8/1995 | Fukasawa et al. | 375/205 |
| 5,467,367 | 11/1995 | Izumi et al. | 375/206 |

OTHER PUBLICATIONS

Oppenheim & Shafer, Discrete-Time Signal Processing, 1989, pp. 105–111.
Gregory W. Wornell "Spread-Signature CDMA: Efficient Multiuser Communication in the Presence of Fading" IEEE Transactions on Information Theory vol. 41, No. 5, Sep. 1995 pp. 1418–1438.
John G. Proakis, *Digital Communications*, 2nd ed., 1989, McGraw-Hill pp. 802–803, 362–372, 821–823, 377–380, 441–451, 728–738.
Armin Wittneben, IEEE GLOBECOM, 1990, "An Energy- and Bandwidth-Efficient Data-Transmission System for Time-Selective Fading Channel".

*Primary Examiner*—Wellington Chin
*Assistant Examiner*—William Luther

[57] ABSTRACT

Method and apparatus for preparing a message stream of symbols for wireless transmission by pre-coding it through convolution with a characteristic "signature" of predetermined symbols identifying a particular user of the message system. The time duration of the signature should exceed the inter-symbol interval of the message stream in order to reduce the likelihood of error caused by fading in the transmission channel.

25 Claims, 2 Drawing Sheets

SPREAD-RESPONSE PRECODING SYSTEM HAVING SIGNATURE SEQUENCES LONGER THAN THE INTER-SYMBOL TIME INTERVAL

BACKGROUND OF THE INVENTION

1. Field of the Invention

This invention relates to a method and apparatus for preparing a stream of symbols to be transmitted over a channel. Typically, the channel is a wireless or radio channel between a base station and a plurality of mobile stations such as those employed in digital mobile radio, often called "cellular radio." The utility of the invention is by no means limited to mobile radio; it is especially adapted for use in the preparation of symbols and in the transmission of messages over any channel characterized by a substantial degree of fading. Such fading may occur in terrestrial broadcast systems such as television and radio, as well as in mobile communications systems. The applicability of the principles of the invention is not confined to any particular transmission-frequency band.

A significant portion of the signal processing in accordance with the invention is performed in the discrete, or digital, domain. The original source of data and symbols to be prepared for transmission may indeed be discrete or digital. However, the source of the information or other substantive material to be prepared for transmission may alternatively be analog in nature, such as music or the human voice. In that event, the analog information is converted to discrete form for processing in accordance with the invention, and then very likely converted back to a waveform prior to transmission over the channel. Anyway, precoding is useful in minimizing or eliminating inaccuracies and errors attributable to noise and fading which distort the signal as it is transmitted over the channel. Such noise and fading are anticipated, and the invention enables their effects to be minimized when the transmitted signal is received, detected, and decoded. In the following disclosure, the word "precoding" is used to denote a processing step which takes place closer to the transmission channel than another "coding" step which may occur prior in time to the precoding step. The precoding step is so designated because of its relevance to the channel, and is discussed from the viewpoint of the channel.

2. Description of the Prior Art

Ever since the monumental work of Claude Shannon established "information theory" as a recognized field of art, engineers and researchers have been trying to find ways to make optimum use of the "channel capacity" of which Shannon spoke. In general, of course, the objective has been to transmit information at a maximum rate over a given channel with a minimum amount of distortion or error in transmission. Unfortunately, as is well known, these objectives compete with one another for the resources available to the transmission-system designer. Moreover, the designer may or may not have control over the frequency bandwidth which characterizes the transmission channel. In general, maximizing the bandwidth or power tends to maximize the possible rate of information transmission. Furthermore, utilization of the full amount of available bandwidth or power also increases the amount of information which can be transmitted over a channel for any given probability of error in transmission.

The possibility of error caused by distortion of a signal during transmission over a channel may arise from fading or noise in the channel. The fading in the channel has a multiplicative or time-varying convolutional effect upon the transmitted signal, whereas certain types of noise in the channel have an additive effect upon the signal. Generally, the fading characteristics of a transmission channel may be functions of both the nature of the transmission medium and any relative motion between a transmitter and a receiver in a given system. Fading leads to variations in the quality of the transmission channel both in time and in frequency.

Various types of "diversity" techniques are widely used in communication systems to compensate for variations in the quality of the channel. Such techniques range from simple multiple-transmission strategies in time, frequency, and space to more sophisticated diversity techniques based on the use of coding of the information or symbols to be transmitted. Coding is used to combat the effects of both fading and additive noise in the channel.

In order for coding of data or symbols to be effective, especially against fading in the channel, it has generally been necessary to combine coding with "interleaving," a simple but nevertheless useful form of precoding. The purpose of interleaving is to scramble the stream of coded data so that the fading in the channel, as effectively "seen" by the data stream, is uncorrelated from time sample to time sample of the data stream.

Two popular methods of coding a data stream are "block coding" and "convolutional coding." In block coding, a portion of the data stream having a fixed length in terms of number of symbols is encoded as an entity. Convolutional coding, on the other hand, is sequential; each step in the coding or "encoding" process operates on a number of "past" symbols of the stream as well as on "current" symbols of the stream. The efficiency of the coding (or "encoding") operation is increased if the length of the block is increased, or if the "constraint length," in the case of convolutional coding, is increased. However, increasing the block length or the constraint length, as the case may be, also increases the complexity of the implementation of the coding and decoding operations.

Both block coding and convolutional coding may be adapted to serve the purposes of error minimization, error detection, and error correction. The encoding operation is primarily concerned with the prevention of errors which might occur because of the deleterious effect of fading and noise in the transmission channel upon the waveform passing over the channel. A purpose of coding is to spread the symbols over a period of time and to provide redundancy in the transmission so that the effects of fading and noise in the channel will be lessened or eliminated. Such a "spread-spectrum digital communication system" is illustrated on pages 802 and 803 of the book entitled *Digital Communications* by John G. Proakis, the second edition of which was published in 1989 by McGraw-Hill Book Company. In that reference, the author shows and describes a system in which the symbols of the data stream are passed through a "channel encoder" and then a "modulator" in which a binary-valued sequence of "pseudo-noise" from a separate pattern generator is impressed upon the symbols of the stream prior to conversion of the data stream into analog form for transmission as a waveform over the channel. By proper synchronization of the demodulator at the receiving end of the channel, the "pseudo-noise" can be separated from the received estimated data stream after the pseudo-noise has served its purpose.

Another reference which addresses time diversity in digital data-transmission systems is a paper published by Armin Wittneben in the proceedings of the IEEE GLOBECOM in 1990 and entitled "An Energy-and Bandwidth-Efficient Data-Transmission System for Time-Selective Fading Channels." The paper by Wittneben, as implied by the title, is directed to overcoming the effects of fading in channels such as those characteristic of mobile data-communication systems. As in the book by Proakis, Wittneben also employs modulation to produce a transmitted signal which "is the sum of scaled and time-shifted base pulses . . . ". However, Wittneben combines his modulation with a process of interleaving, to which reference has already been made. Unfortunately, interleaving is not regarded as the most efficient way of achieving precoding.

SUMMARY OF THE INVENTION

Briefly, the present invention provides an attractive alternative to interleaving and is called "spread-response precoding." When spread-response precoding is employed, the fading channel as seen by the coded data stream is effectively transformed into a simple additive white-noise channel. The precoding step is used in conjunction with a coding step which affects the data stream at a point in time prior to the precoding step. The reason for adoption of this terminology has already been explained.

With the adoption of a coding step followed by a precoding step, the precoding step combats the fading of the channel, whereas the coding step combats the additive noise resulting from conditions in the channel. It appears that such partitioning between the countermeasures against fading and the countermeasures against additive noise is advantageous in lessening complexity of the digital data system. Spread-response precoding, which employs simple linear signal processing at the transmitter and the receiver, is less complex in computational terms than certain algorithms for coding and decoding the data stream to correct errors therein. Moreover, precoding constitutes a diversity strategy that incurs no additional cost in bandwidth or signal power, and is competitive with traditional approaches with regard to robustness and reasonable signal delay.

BRIEF DESCRIPTION OF THE DRAWING

The invention summarized above will be described in detail in the following specification. The specification will be best understood if read while referring to the accompanying drawings, in which FIG. 1 is a block diagram, or flow sheet, illustrating the processing of information from its source to a transmitting antenna through, among other circuitry, a precoder/signal modulator 15; and in which

DETAILED DESCRIPTION OF THE PREFERRED MODE OF CARRYING OUT THIS INVENTION

Figure 1:
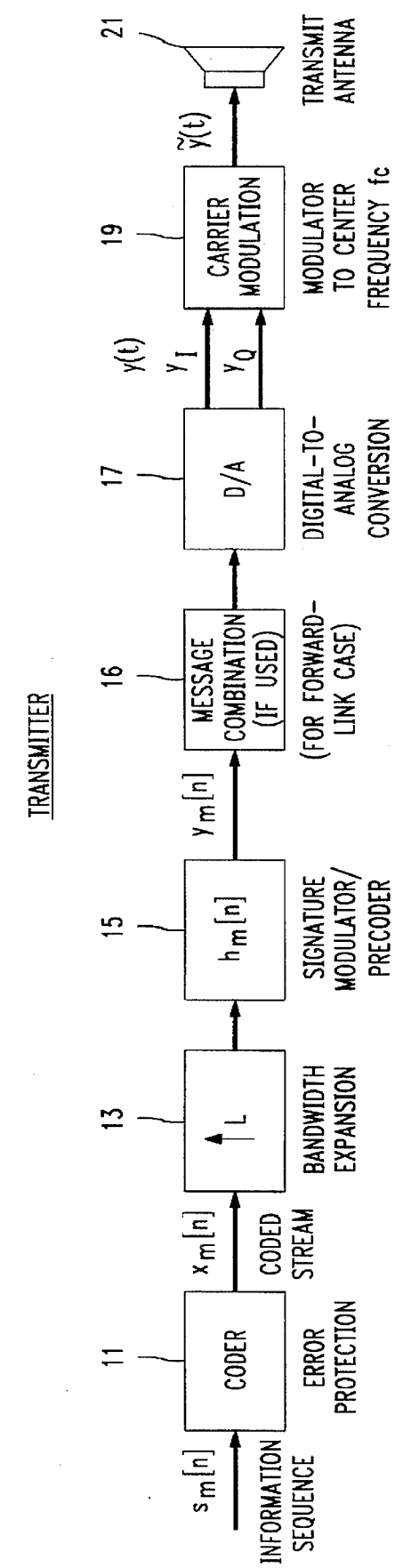
Figure 2:
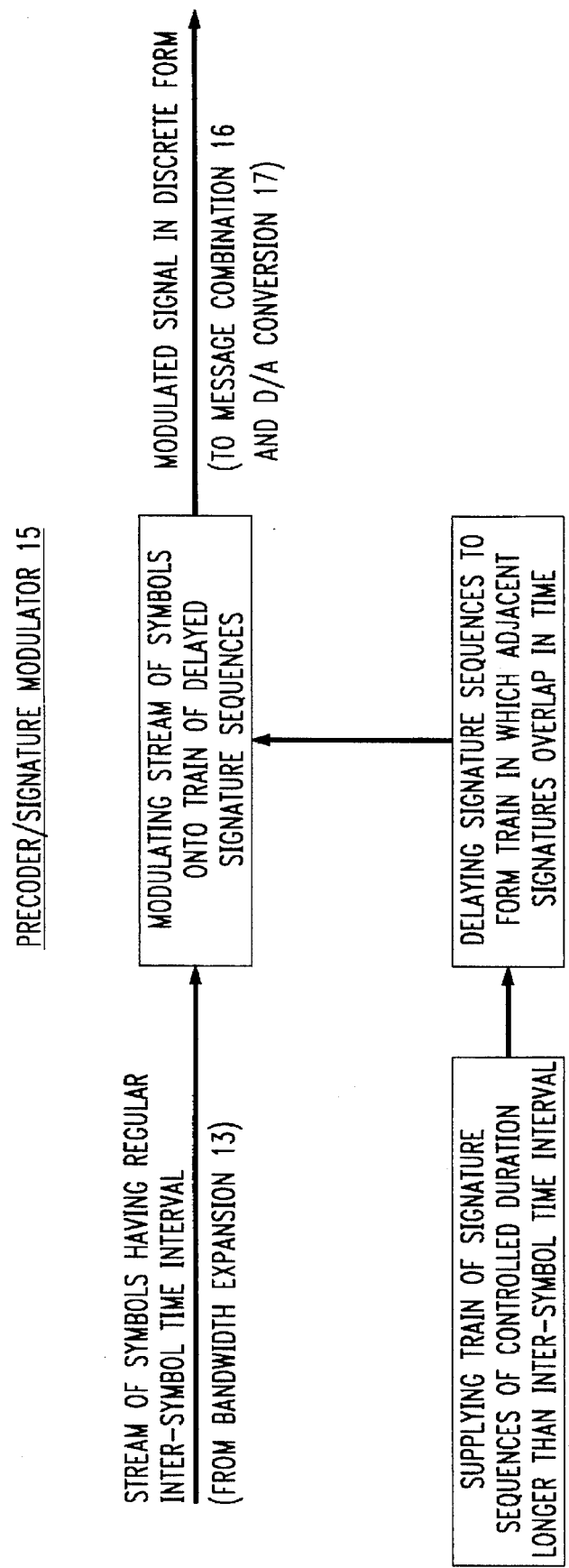
FIG. 2 illustrates the several steps that take place in precoder/signal modulator 15, which may be a single physical structure.

As a preface to the detailed description, it is worth observing, once again, that the "message" to be processed and transmitted may originate as either an analog signal or a discrete signal. The message could be a musical melody, a voice, the output of a digital computer, or the reproduction of a printed page. In any event, if the message is not originally discrete in form, it should be converted to discrete form for coding and other processing. Later, to prepare the processed data for transmission over the channel, it is converted to a "waveform" which is analog in nature. It is presumed that, during transmission over the channel, the waveform becomes distorted or corrupted, to some extent, by the fading and noise in the channel. Subsequent to reception of the distorted waveform by the receiving antenna, the distorted waveform, as received, will be prefiltered to remove therefrom noise outside the desired passband of the received waveform. Then, the prefiltered waveform will be separated from its carrier wave by a demodulation step and will be converted back to discrete form. Subsequently, the receiver will perform upon the detected signal in discrete form a series of steps which are essentially the reverse of the series of steps by which the discrete signal was processed in the transmitter. Finally, the "estimated" signal, as detected and processed by the receiver, will be converted to whatever form, e.g. digital or analog, is required by the ultimate user.

The channel may be regarded as a transmission structure having detailed characteristics which vary as a function of time. Those characteristics may be "sampled" on either a periodic or an irregular basis. In any event, the samples will differ from one another. Nevertheless, the performance of communication systems using such a channel is generally dictated by the average characteristics of that channel over time. Most capacity estimates for communication channels involve taking an average of this type. If a stream of discrete symbols is to be prepared for transmission over a channel, an efficient communication strategy would, to the extent feasible, "spread" the transmission of each symbol over a large number of time samples of the channel. Conveniently, spreading of this type can be achieved through simple linear time-invariant ("LTI") filtering of the coded symbol stream. In the sense of this invention, the word "filtering" is not limited to a passive device, but more often connotes an active device such as a modulator. The "precoding" which will be described in detail in this specification is a filtering step of the latter type. Specifically, the precoding is accomplished by convolution of the coded symbol stream $x[n]$ with another discrete sequence which may be designated by the "signature" $h[n]$.

That is to say, $$y[n]=x[n]* h[n].$$

This, in simplified form, is the equation of the "precoding" step as it will be described in detail in the following paragraphs. It is highly desirable that the precoding step be as nearly lossless as possible. Techniques for designing such filters are described in the Proakis book between pages 362 and 372.

Considering specifically the processing which takes place within the transmitter, we may assume that the information to be transmitted consists of—or can be put in the form of—an arbitrarily long sequence of bits which we denote by "$s[n]$," or "$s_m[n]$" in the case of multiple users up to "M." It will be understood that "n" denotes a particular bit in the sequence and, therefore, is indirectly an indicator of elapsed time. It may be further assumed that the sequence of bits is antipodal, i.e., each bit is either +1 or −1. In most instances of the practice of this invention, the sequence of bits $s[n]$ will be first processed by a coder 11 which may apply error-correction coding to the bit stream to produce $x[n]$, the coded symbol stream to which reference has already been made. Typically, the coded symbol stream $x[n]$ is a complex-valued sequence of numbers, which will hereinafter be referred to as "symbols."

If the coding step is used, it may be implemented in any of a number of different ways. One such way, which is quite satisfactory, is "trellis-coded modulation." A description of one particular type of trellis-coded modulation appears on pages 128 and 129 of *Basics of Communications and Coding*, a book by William G. Chambers published by Oxford Science Publications in 1985. In general, the use of coding such as trellis-coded modulation reduces errors and improves the overall performance of the communication system. However, in some applications, adequate performance may be obtained without such coding. In that event, x[n]=s[n].

Once again, the coding step is generally implemented in digital circuitry, using a custom-designed chip (integrated circuit), an off-the-shelf coded chip such as may be obtained from Qualcomm, Inc., San Diego, Calif., or a programmable, general-purpose digital signal processor such as the TMS 320 series, available from Texas Instruments.

Next, the coded symbol stream x[n] is upsampled by a factor "L" in an expander 13. This is a bandwidth-expansion step which comprises inserting (L−1) zeros or other trivial symbols after every sample of x[n]. This step represents part of the spreading which is useful in overcoming the effects of fading in the transmission channel. The larger the value of L, the greater is the frequency diversity that can be exploited. However, increasing the value of L can be costly in terms of bandwidth, and the expansion may be limited by the amount of bandwidth that is available. When adequate bandwidth is available, the expansion step should be employed in such a way as to take full advantage of it. However, in some instances of limited available bandwidth, it may be necessary to dispense with the expansion step.

Following bandwidth expansion, if that step is included in the method, the expanded coded stream of symbols is modulated, using convolution, onto a "signature sequence" of symbols which is supplied especially for this purpose. The signature sequence may be denoted as "$h_m[n]$." The "m" is used in the case of multi-user communication systems to denote the signature assigned to the "mth" user. If the system has only one user, the m is not needed. In any event, the signature denoted by the symbol h[n] is at the heart of the present invention.

In the case of a single-user system, convolution with the signature h[n] is referred to as "precoding" and is implemented by an active precoding filter in the form of a precoder/signature modulator 15. In multi-user systems, on the other hand, the signature is symbolized by "$h_m[n]$," in order to indicate that the respective signatures assigned to the "m" users are distinct from one another. In multi-user systems, the messages of the respective users are transmitted over a common channel by means of code-division multiplexing. Therefore, each user must have a unique signature. We refer to this particular stage as "signature modulation."

In any event, the signature sequence that modulates each symbol has a duration that is longer than the inter-symbol time interval characterizing the symbol stream, whether or not that stream x[n] has been expanded in bandwidth. This is in marked contrast to traditional code-division-multiplexing systems, wherein the length of the signature sequence is equal to or less than the inter-symbol interval. Once again, each user should have a unique signature comprising symbols of constant spacing and together constituting a "word" of constant length. The inter-symbol time interval characterizing the symbol stream is the time spacing between respective initiations of successive symbols of said symbol stream.

If the number of users of the system is M, the bandwidth-expansion parameter L must be equal to or greater than M, but may otherwise may be freely chosen in designing the system. However, limitations of available bandwidth are likely to make it impractical to increase L indefinitely.

In mathematical terms, the signature-modulated stream $y_m[n]$ for the mth user is constructed according to the expression:

$$y_m[n] = \sum_k x_m[k] h_m[n - kL], \text{ wherein } k \text{ is a constant.} \quad \text{Equation (1)}$$

The single-user system may be regarded as a special case of the multi-user system in which M=1, so that Equation (1) becomes simply:

$$y[n] = \sum_k [k] h[n - kL]. \quad \text{Equation (2)}$$

As has been stated in prior paragraphs, in the single-user case, the precoder/signature modulator 15 may be regarded as an active filter. In a more general sense, precoder/signature modulator 15 may be regarded as an aggregation of M subfilters $h_m[n]$, where M is a design parameter. If this more general viewpoint is taken, the construction of the precoder/signature modulator 15 comprising M subfilters is governed by the following expression:

$$y[n] = \sum_{m=1}^{M} \sum_k x[kM + m - 1] h_m[n - kL]. \quad \text{Equation (3)}$$

In Equation (3), once again, L is the bandwidth expansion parameter. Whichever of the above-noted constructions may be applicable, precoder/signature modulator 15 convolves the sequence of symbols that constitutes the signature sequence with the coded symbol stream which constitutes the data to be transmitted. If the coded symbol stream x[n] has been upsampled, the upsampled coded symbol stream enters into the convolution step with the signature sequence. If no upsampling has taken place, then the coded symbol stream x[n] is directly convolved with the signature sequence. Thus, the operation represented by each of Equations 1–3 may be regarded as a modulation process defined by the convolution of the signature sequence with the coded symbol stream in precoder/signature modulator 15. From the physical standpoint, the symbols of the signature sequence may be imagined as multiplied by a group of symbols of the coded and expanded data stream, with the products of such multiplication then summed to become the instantaneous output of the convolution. Further, as the coded and expanded data stream "moves on," one symbol from the data stream no longer participates in the convolution operation, and is replaced by a new symbol from the data stream. The next step in the convolution process is then performed by an amended roster of "players" from the data stream. Thus is achieved a "spreading" of the convolution products, which helps to overcome the effects of fading in the channel.

Maximizing the amount of spreading tends to optimize the performance of the system in combating fading and noise. However, spreading inherently introduces delay into the system. Hence, the amount of delay which can be tolerated becomes a necessary design criterion.

There is some freedom of choice in the makeup of the signature sequences to serve as h[n] or $h_m[n]$, as the case may be, depending upon whether the system is designed for a single user or multiple users. One highly-efficient form of signature sequence is a train of binary valued symbols (e.g. $h_m[n]=\pm 1$) having a length "N". Once again, in the case of a multi-user system, each user should have its own established signature sequence.

In the generation of the signature sequences, it is often useful to upsample a prototype signature by a factor "K" to increase its spread. The factor K may in general be chosen to match the "coherence-time characteristics" of the fading channel, subject to the constraint that K not be a multiple of a prime factor of M. As the coherence time of the channel increases, the value of K would desirably be increased. Likewise, "N", the length of the signature sequence in relation to the inter-symbol spacing of the train of coded data, should have a substantial value, certainly greater than unity. Increasing the value of N tends to improve the system performance but, once again, the maximum allowable delay in the system may limit the degree to which N can be increased.

Like the coding step which has already been described, the precoding/signature-modulation step is also generally implemented with digital circuitry. Either a custom-designed special-purpose chip or a programmable, general-purpose digital signal processor chip such as from the Model TMS 320 series of Texas Instruments is satisfactory for precoder/ signature modulator 15.

In the case of single-user systems, the product of the precoding step is a complex-valued stream which may be denoted "y[n]." This stream is fed directly to a digital-to-analog converter 17 for further processing. In the case of multi-user systems, on the other hand, two possible situations must be considered. The first such situation is that of forward-link transmission, such as that of the base station in a mobile communication system, broadcasting a plurality of different messages $s_m[n]$ simultaneously to a plurality of mobile stations. If the base station is transmitting a plurality of messages to a plurality of mobile stations, the messages are transmitted over a single channel, but in a coordinated fashion. In that situation, the stream of symbols which is fed to a digital-to-analog converter 17 in the base station may be represented by the following mathematical expression, which signifies the superposition of the various messages:

$$y[n] = \sum_m y_m[n]. \qquad \text{Equation (4)}$$

In reverse-link transmission, on the other hand, the mobile stations transmit their messages $s_m[n]$ back to the base station in an uncoordinated manner. Presumably, each mobile station will have a precoder/signature modulator which carries out the signature-modulation operation substantially as described in the immediately-foregoing paragraphs. The product of the convolution operation in each such precoder/signature modulator will be $y_m[n]$, where the "m" identifies the respective mobile stations. That precoded stream is then processed by a separate digital-to-analog converter in each mobile station in preparation for transmission back to the base station.

Once again, if the base station is preparing to make a forward-link transmission of a plurality of messages to the mobile stations, the discrete stream of symbols y[n] which is to be prepared for transmission is a superposition of a plurality of messages $y_m[n]$ which together constitute the input to the digital-to-analog converter. By contrast, when each of the mobile stations prepares to transmit its message back to the base station, the input to its digital-to-analog converter is simply the sole output of its own signature modulator (or precoder.)

The digital-to-analog converter 17 at either the base station or the mobile station processes its input sequence y[n] in a well-known way. It samples y[n] at an appropriate rate and with an appropriate degree of quantization. The degree of quantization is the number of bits used to represent each sample of y[n]. The rate must be consistent with the available bandwidth of the particular communication system. Again, the degree of quantization affects the performance of the overall system and should be maximized consistent with the available bandwidth.

Each digital-to-analog converter requires two synchronized channels: one for processing the real part of the sequence y[n], and the other for processing the imaginary part of this sequence. The respective outputs of the converter may be denoted as the "in-phase component of y(t)," and the "quadrature component of y(t)." The respective symbols in the time domain are "$y_I(t)$," for the in-phase component, and "$y_Q(t)$," for the quadrature component of y(t). Suitable chips for this D/A conversion may be selected from a wide range of commercially-available products.

Together, $y_I(t)$ and $y_Q(t)$ constitute y(t), which may be regarded as a base-band signal to be prepared for transmission. First, y(t) is modulated up to a desired carrier frequency by means of a carrier modulator or mixer 19. Specifically, the in-phase component $y_I(t)$ is multiplied by $\cos(2\pi f_c t + \theta)$, while the quadrature component $y_Q(t)$ is multiplied by $\sin(2\pi f_c t + \theta)$. It will be understood that $f_c$ is the desired center frequency in the radio spectrum for transmission of the signal, while $\theta$ is an arbitrary phase. Both components are passed through amplifiers, not shown in FIG. 1 of the drawing, to achieve the desired power level for transmission. The superposition of the two aforementioned components is then broadcast through a suitable RF antenna 21.

SUMMARY OF THE DISCLOSURE

The foregoing paragraphs have disclosed and discussed in detail a method and apparatus for preparing for transmission at least one stream of symbols having a regular inter-symbol time interval. The stream of symbols may be derived from any desired source, analog, digital, or "discrete." The stream of symbols is prepared for transmission over a channel which is anticipated to have fading characteristics and which is also anticipated to subject the transmitted signal to the deleterious effect of additive noise. The important processing of the stream of symbols assumes that the symbols are in discrete form or have been converted into discrete form which may be designated as an information sequence $s_m[n]$. Preferably, the information sequence $s_m[n]$ is then coded against error resulting from additive noise to be encountered in the transmission channel. The coded stream of symbols $x_m[n]$ may then be upsampled by a factor L to expand its bandwidth by interposing, between adjacent pairs of meaningful symbols, one or more trivial symbols, such as "zeros," which act merely as spacers and expand the system bandwidth. This step is definitely helpful in the effort to overcome the effects of channel fading. However, the extent to which it can be employed is limited by the available bandwidth, and sometimes it may be omitted.

A most-important factor in the practice of the method and apparatus of the present invention resides in the precoding/ signature-modulation step of the method. The duration of each one of a train of signature sequences pre-established for the respective users of the system should be longer than the inter-symbol time interval characterizing the train of symbols to be transmitted.

Although a full disclosure and discussion of all the aspects of the method and apparatus of the present invention have been presented in the foregoing paragraphs, it is possible that certain variations thereof may be made in the future without departing from the scope of this invention. Accordingly, the scope of the invention is defined in the following claims.

What I claim as new and desire to secure by Letters Patent of the United States is as follows:

1. A method of preparing for transmission at least one stream of symbols characterized by a regular inter-symbol time interval, said method comprising the steps of:

(a) supplying a train of signature sequences each of which has a controllable duration longer than said inter-symbol time interval, (b) delaying signature sequences of said train to form a train of delayed signature sequences in which adjacent signature sequences overlap in time, and (c) modulating said stream of symbols onto said train of delayed signature sequences, said modulating step including periodically determining instantaneous products of said symbols with corresponding values of said train of overlapping delayed signature sequences and summing said instantaneous products to develop a modulated signal in discrete form.

2. A method in accordance with claim 1 in which each of said symbols can have only one of two possible values.

3. A method in accordance with claim 1 in which each of said symbols can have only one of more than two possible values.

4. A method in accordance with claim 1 in which said modulating step is performed by convolution.

5. A method in accordance with claim 1 in which said signature sequences as supplied are substantially identical.

6. A method in accordance with claim 1 in which said signature sequences as supplied differ in time duration.

7. A method in accordance with claim 1 in which said signature sequences as supplied differ in content.

8. A method in accordance with claim 7 in which the different contents of said respective signature sequences identify different respective streams of symbols.

9. A method in accordance with claim 1, further including the step of converting into analog form said modulated signal in discrete form, thereby providing a complex analog signal.

10. A method in accordance with claim 9, further including the additional steps of:

(a) resolving said complex analog signal into an in-phase component and a quadrature component, (b) providing a carrier wave, and (c) modulating said carrier wave with said in-phase component and said quadrature component to yield a modulated carrier wave.

11. A method in accordance with claim 10 including the still-further step of transmitting said modulated carrier wave through an antenna.

12. A method in accordance with claim 1 in which each said stream of symbols represents a message from a single source and in which a signature sequence is supplied for each such source.

13. A method in accordance with claim 1 in which each said stream of symbols represents messages from a plurality of sources and in which a distinctive signature sequence is supplied for each such source.

14. A method of preparing for transmission at least one stream of symbols characterized by a regular inter-symbol time interval, said method comprising the steps of:

(a) expanding said stream of symbols in the time domain to produce a time-expanded symbol stream characterized by an expanded inter-symbol time interval, (b) supplying a train of signature sequences each of which has a controllable duration longer than said expanded inter-symbol time interval, (c) delaying signature sequences of said train to form a train of delayed signature sequences in which adjacent signature sequences overlap in time, and (d) modulating said time-expanded symbol stream onto said train of delayed signature sequences, said modulating step including periodically determining instantaneous products of said symbols with corresponding values of said train of overlapping delayed signature sequences and summing said instantaneous products to develop a modulated signal in discrete form.

15. A method in accordance with claim 14 in which said expanding step comprises inserting spacing data between symbols of said stream.

16. A method of coding and preparing for transmission over a fading channel a series of data bits, said method comprising the steps of:

(a) coding said series of data bits against errors introducible by said fading channel to provide a coded stream of symbols characterized by a regular inter-symbol time interval, (b) expanding said coded stream of symbols in the time domain to produce a time-expanded symbol stream in which adjacent symbols of said stream are separated by an expanded inter-symbol time interval, (c) supplying a train of signature sequences each of which has a duration longer than said expanded inter-symbol time interval, (d) delaying signature sequences of said train to form a train of delayed signature sequences in which adjacent signature sequences overlap in time, and (e) modulating said time-expanded symbol stream onto said train of delayed signature sequences, said modulating step including periodically determining instantaneous products of said symbols with corresponding values of said train of overlapping delayed signature sequences and summing said instantaneous products to develop a modulated signal in discrete form.

17. A method in accordance with claim 16 in which said coding step is performed by trellis coding.

18. A method in accordance with claim 16 in which said coding step is performed by convolutional coding.

19. A method in accordance with claim 3 in which said coding step is performed by block coding.

20. A method of coding and preparing for transmission over a fading channel a series of data bits, said method comprising the steps of:

(a) coding said series of data bits against errors introducible by said fading channel to provide a coded stream of symbols characterized by a regular inter-symbol time interval, (b) supplying a train of signature sequences each of which has a duration longer than said inter-symbol time interval, (c) delaying signature sequences of said train to form a train of delayed signature sequences in which adjacent signature sequences overlap in time, and (d) modulating said coded stream of symbols onto said train of delayed signature sequences, said modulating step including periodically determining instantaneous products of said symbols with corresponding values of said train of overlapping delayed signature sequences and summing said instantaneous products to develop a modulated signal in discrete form.

21. A method in accordance with claim 20 in which said coding step is performed by convolutional coding.

22. A method in accordance with claim 20 in which said coding step is performed by trellis coding.

23. A method in accordance with claim 20 in which said coding step is performed by block coding.

24. Apparatus for preparing for transmission at least one stream of symbols characterized by a regular inter-symbol time interval, said apparatus comprising:
 (a) means for supplying a train of signature sequences each of which has a controllable duration longer than said inter-symbol time interval,
 (b) means for delaying signature sequences of said train to form a train of delayed signature sequences in which adjacent signature sequences overlap in time, and
 (c) a modulation device for identifying specific values of said train of delayed signature sequences corresponding to respective symbols of said stream, forming instantaneous products of said specific values of said train with respective corresponding symbols of said stream, and summing said instantaneous products to develop a modulated signal in discrete form.

25. Apparatus in accordance with claim 24 in which said modulation device takes the form of an integrated circuit.

* * * * *